US009703684B1

(12) United States Patent
Sanborn de Asis et al.

(10) Patent No.: US 9,703,684 B1
(45) Date of Patent: Jul. 11, 2017

(54) UNIFIED USER ELEMENT INFORMATION PROVISIONING

(71) Applicant: Amazon Technologies, Inc., Reno, NV (US)

(72) Inventors: Ezekiel Wade Sanborn de Asis, Santa Clara, CA (US); Prasanna Venkatanarayanan, Chennai (IN); Sai Vinayak, Chennai (IN)

(73) Assignee: AMAZON TECHNOLOGIES, INC., Reno, NV (US)

( * ) Notice: Subject to any disclaimer, the term of this patent is extended or adjusted under 35 U.S.C. 154(b) by 361 days.

(21) Appl. No.: 14/043,180

(22) Filed: Oct. 1, 2013

(51) Int. Cl.
*G06F 9/44* (2006.01)
*G06F 11/36* (2006.01)

(52) U.S. Cl.
CPC ................. *G06F 11/3668* (2013.01)

(58) Field of Classification Search
CPC .................................................. G06F 11/3668
USPC .................................................. 717/124–167
See application file for complete search history.

(56) References Cited

U.S. PATENT DOCUMENTS

| | | | | |
|---|---|---|---|---|
| 5,596,714 | A * | 1/1997 | Connell | G06F 11/3688 714/38.1 |
| 5,892,900 | A | 4/1999 | Ginter et al. | |
| 7,421,683 | B2 * | 9/2008 | Robertson | G06F 11/3696 714/E11.207 |
| 7,434,167 | B2 * | 10/2008 | Sinclair et al. | 715/744 |
| 8,196,112 | B1 * | 6/2012 | Cansizlar | 717/126 |
| 8,386,560 | B2 * | 2/2013 | Ma et al. | 709/203 |
| 8,701,090 | B2 * | 4/2014 | Zavatone | 717/124 |
| 2004/0041827 | A1 * | 3/2004 | Bischof | G06F 9/45512 715/704 |
| 2004/0061714 | A1 * | 4/2004 | Sinclair et al. | 345/705 |
| 2004/0073497 | A1 | 4/2004 | Hayes et al. | |
| 2004/0194065 | A1 * | 9/2004 | McGrath | G06F 9/44 717/124 |
| 2011/0173590 | A1 * | 7/2011 | Yanes | G06F 11/3664 717/125 |
| 2012/0023484 | A1 * | 1/2012 | Demant et al. | 717/125 |

OTHER PUBLICATIONS

Hurtienne, Jörn, and Luciënne Blessing. "Design for Intuitive Use—Testing image schema theory for user interface design." 16 th International Conference on Engineering Design. 2007. pp. 1-12.*

(Continued)

*Primary Examiner* — Satish Rampuria
(74) *Attorney, Agent, or Firm* — K&L Gates LLP (57) ABSTRACT

Embodiments of methods, systems and storage media associated with a unified UI element query interface ("UEI") configured to facilitate provisioning of UI element information are described. A view server may be configured to respond to queries made using the UEI to provide indications of UI elements that are being rendered by one or more rendering engines. The view server may also be configured to respond to queries about specific UI elements to provide properties for the UI elements. The UEI may provide a single point of interaction for an application that wishes to interact with UI elements rendered by different rendering engines. Other embodiments may be described and/or claimed.

23 Claims, 7 Drawing Sheets

(56) References Cited

OTHER PUBLICATIONS

Landay, James A., and Brad A. Myers. "Interactive sketching for the early stages of user interface design." Proceedings of the SIGCHI conference on Human factors in computing systems. ACM Press/Addison-Wesley Publishing Co., 1995. pp. 43-50.*

Karat, Claire-Marie, Robert Campbell, and Tarra Fiegel. "Comparison of empirical testing and walkthrough methods in user interface evaluation." Proceedings of the SIGCHI conference on Human factors in computing systems. ACM, 1992. pp. 397-404.*

US Office Action for U.S. Appl. No. 12/560,233, dated Nov. 18, 2014, 30 pages.

\* cited by examiner

UNIFIED USER ELEMENT INFORMATION PROVISIONING

BACKGROUND

As applications (and other computer code) are developed, the applications, for example, are often tested, sometimes extensively, to identify and correct problematic code. In particular, developers may desire to test user interface ("UI") code to improve experiences for users of the application. Frequently, such testing is performed by testing automated interactions with one or more user interface ("UI") elements of windows that are displayed by an application, such as text, images, buttons, video displays, etc. Additionally, other automated interactions with UI elements may be performed in contexts other than testing. For example, in some contexts it may be desirable to record interactions performed by a user with an application, such as to record usage tutorials or to troubleshoot user issues.

However, using existing techniques, it can be difficult to obtain information about available UI elements in order to facilitate such testing. In particular, it may not be clear, in a given context, which UI elements are available, and/or being displayed at a particular time. Further, for those that are available, various properties of these UI elements, (such as whether they are being displayed, whether they are active, what text and/or image they are displaying, etc.) may not be readily available to a testing application seeking to perform interactions to test an application under test or by other applications or developers seeking automated interactions. In these properties may be used to validate that UI elements are displayed as expected and/or that objects related to the UI elements are operating as expected. In some techniques, a testing application may seek to obtain information about UI elements by directly accessing screen data, in effect "scraping" information from the screen. However, this can be an inexact technique, and may be particularly error-prone when applied to difficult-to-parse UI information, such as ideographic languages or images.

In some techniques, a testing application may directly access UI element information through programmatic techniques. However, in many devices and environments, windows, and the UI elements they contain, may be rendered by different rendering engines. These rendering engines may additionally be implemented in different languages or environments, such as Java, HTML, JavaScript, etc. Thus, a developer seeking to directly obtain information through programmatic techniques may find himself or herself using wildly different techniques to obtain UI element information from the different rendering engines.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Techniques described herein provide for a unified user interface element query interface ("UEI") configured to facilitate provisioning of user interface element information ("UI element information"). Through such provisioning, the UEI may facilitate programmatic interactions with UI elements in a computing device. A view server may be configured to respond to queries made using the UEI by a testing application or other application or service that wishes to perform interactions with UI elements. The view server may be configured to respond to queries to provide indications of UI elements that are being rendered by one or more rendering engines, such as by providing one or more unique identifiers of the UI elements. The view server may also be configured to respond to queries about specific UI elements to provide properties for the UI elements.

The view server may be configured to provide UI element information, such as indication so of UI elements and user interface element properties ("UI interface properties"), via the UEI for UI elements that are rendered by various rendering engines. Thus, the UEI may provide a single point of interaction for an application that wishes to interact with UI elements rendered by different rendering engines, such as a testing application. This may facilitate the testing application in interacting with the UI elements merely by referring to the UEI and without additional requirements that the application know particular implementation or communication details of particular UI elements and/or particular rendering engines.

The view server may include front end and back end components in order to facilitate provisioning of UI element information. The view server front end may provide the UEI to applications and/or services that wish to obtain UI element information. The view server may additionally include multiple view server back ends that are each associated with rendering engines. The view server back ends may be configured to operate in association with the rendering engines in order to obtain information about UI elements. The view server back ends may additionally obtain UI element property in different manners depending on how the rendering engines provide information. For example, a rendering engine may provide properties for a UI element in a form that supports the UEI. In this case, the view server back end may obtain and forward the properties with no or minimal reprocessing in response to a query. However, if the rendering engine does not provide properties in such a form, the view server back end may obtain UI element properties through additional queries and may assemble the UI element properties in order to generate properties in a structure supported by the UEI. The view server back end may even provide default properties for UI elements when no additional property information is available.

Figure 1:
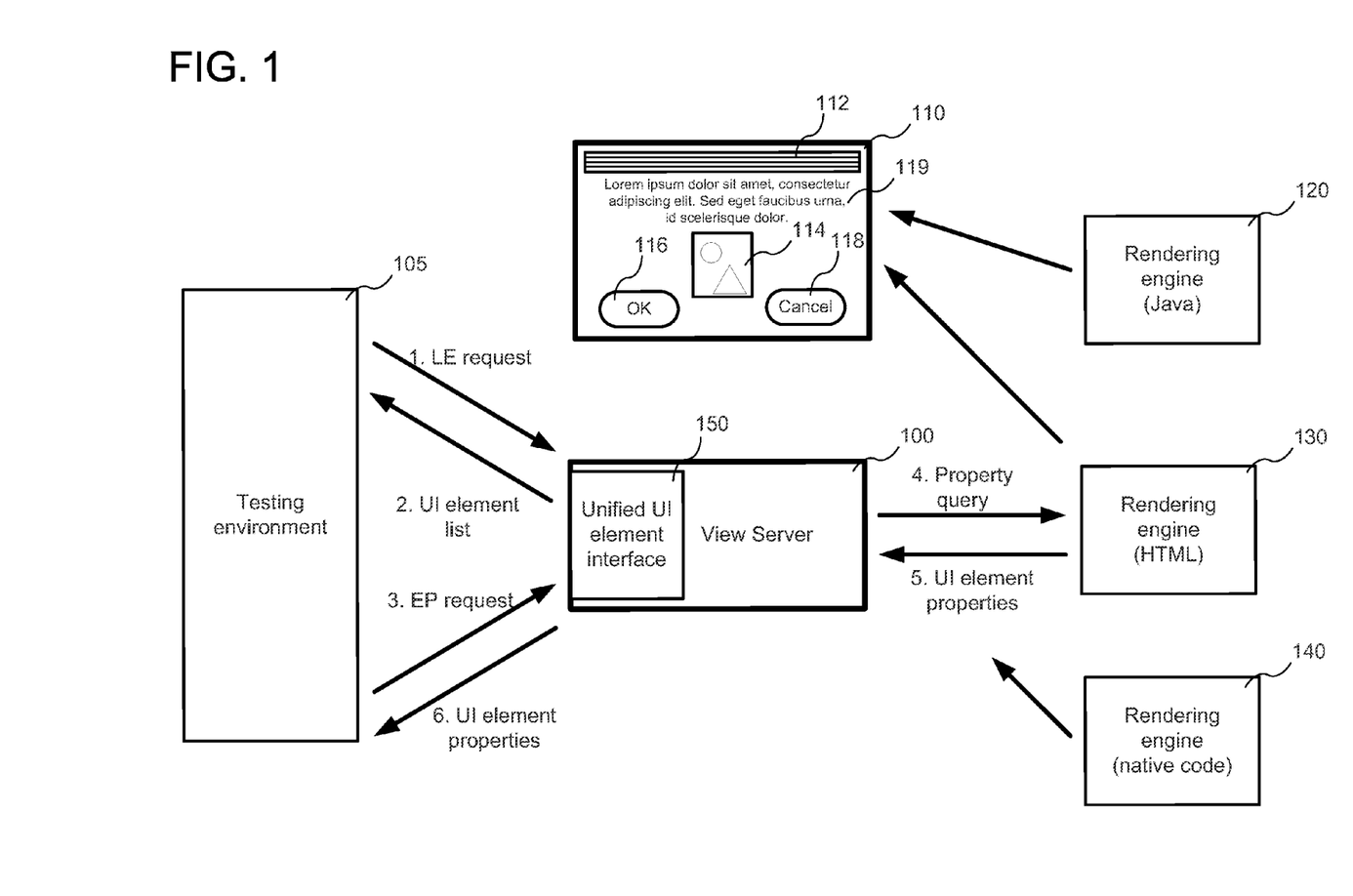
FIG. 1 is a block diagram illustrating example provisioning of UI element information using a unified UI element interface, in accordance with various embodiments.

FIG. 1 is a block diagram illustrating example provisioning of UI element information using a unified UI element interface in accordance with various embodiments. It may be noted that various entities are illustrated; these entities may be implemented on the same or separate computing devices in various embodiments. Additionally, the entities may communicate through a variety of means, including, but not limited to, inter-process communications on a computing device, local networking and/or the Internet.

As illustrated in FIG. 1, a view server 100 may facilitate provisioning of UI element information using a unified UI element query interface 150 ("UEI 150"). While the view server 100 is illustrated in FIG. 1 as a single entity, activities of the view server 100 described herein may be implemented through interactions of multiple entitles, and in particular by a view server front end 200 and one or more view server back ends 250. Examples of the view server front end 200 and one or more view server back ends 250 are described below with reference to FIG. 2.

In various embodiments, the view server 100 may provide the UEI 150 as an interface for applications and/or services to obtain UI element information about UI elements in windows rendered by one or more rendering engines. Thus, in the example of FIG. 1, a testing application 105 may communicate with the view server 100 in order to obtain UI element information from rendering engines 120, 130, 140. In various embodiments, the testing application may be configured to perform testing interactions with an application that is under test, such as automated interactions to facilitate testing of the application under test. The testing application 105 may include a standalone application configured to perform testing interactions with an application. The testing application 105 may be configured to obtain UI element information in order to facilitate these interactions and to validate results of interactions. In some embodiments, rather than simply being an application, techniques described herein may be used by a broader testing environment that may be configured to emulate one or more functions of a computing system executing the application under test. It may be noted that, while the testing application 105 is illustrated as an example of an application that may request and receive UI element information, in various embodiments, other non-testing applications may utilize the techniques described herein.

Through operation of the techniques described herein, the view server 100 may be configured to interoperate with each of these rendering engines 120, 130 and 140 (and/or others) such that the testing application 105 may obtain UI element information about UI elements rendered by the rendering engines regardless of what technologies are used by the rendering engines to render the UI elements. Thus, as illustrated in FIG. 1, multiple rendering engines (such as rendering engines 120, 130 and 140) may be configured to render UI elements. These rendering engines may be configured to render UI elements based on different code bases or other technologies. For example, rendering engine 120, the rendering engine may be configured to execute Java™ code to render UI elements on a display device (not pictured). In the example of rendering engine 130, by contrast, the rendering engine may be configured to render UI elements described with HTML, which may include JavaScript. In the example of rendering engine 140, the rendering engine may be configured to execute natively-running code on a computing device to render UI elements.

The rendering engines 120, 130 and/or 140 may be configured to render a variety of UI elements. In some implementations, these UI elements may be rendered as part of a window, such as example window 110. The UI elements may include elements such as graphical icons or shapes 112; buttons, such as buttons 116 and 118; images, such as image 114; and/or text 119. In various embodiments, other UI elements may be rendered and information about these UI elements may be provisioned using the view server 100 and the UEI 150. In some embodiments, a single rendering engine (such as rendering engine 120) may render all UI elements of a window, while in other embodiments, multiple rendering engines may render different UI elements for a window.

The view server 100 may, in various embodiments, be configured to provide different types of UI information to applications and or services through the UEI 150. In one example, the UEI 150 may include a UI element listing query capability (referred to herein as "LE request"). The view server 100 may be configured to respond to a LE request through the UEI 150 to provide a list of available UI elements. In some embodiments, the UEI 150 may be configured such that the LE request is made by an application using an indicator of a window. The view server 100 may then reply to the requesting application with a list of UI elements that are rendered as part of the identified window.

In another example, the UEI 150 may include a UI element property query capability (referred to herein as "EP request"). The view server 100 may be configured to respond to an EP request through the UEI 150 to provide a properties of an identified UI element. Thus, in some embodiments, the UEI 150 may be configured such that the EP request is made by an application using an indicator of a particular UI element (which may itself have been identified in response to an earlier LE request). The view server 100 may then reply to the requesting application with a list or other structure of UI element properties for the identified UI element. In various embodiments, these UI element properties may include multiple types of UI element properties including, but not limited to: location, size, shape, title, text, activity of the UI element, activation information, focus, whether the UI element is currently visible, etc. In other embodiments, UI element properties may include data for an object associated with a UI element. For example, a UI element showing a book or magazine on a virtual newsstand may be associated with UI element properties describing the book or magazine, such as the media type (e.g., book vs. magazine), number of pages, volume number, issue number, date of publication, language, textual content, etc. This object data may be analyzed and compared to other UI element properties to validate that a UI element is in a correct state. For example, UI element properties describing a title for a book object may be checked against text shown on a UI element associated with that book object.

FIG. 1 illustrates an example use case for the view server 100 implementing the UEI 150. Thus, as illustrated, in a first action, the testing application 105 may make an LE request through the UEI 150 provided by the view server 100. This LE request may, as discussed herein, include an identifier of a window, such as example window 110. Next, at action 2, the view server 100 may provide a list of UI elements in window 110. This LE request may, as discussed herein, include an identifier of a UI element identified from the list of UI elements previous provided.

Next, at action 3, the testing application 105 may make an EP request through the UEI 150 provided by the view server 100. Next, at action 4, the view server 100 may query a rendering engine, such as rendering engine 130, to obtain UI element properties for the identified UI element. In some embodiments, this query may be performed using a view server back end 250, as will be described. Next, at action 5, the rendering engine (and/or the view server back end 250) may provide one or more UI element properties to the view server 100. The view server 100 may, in turn, provide these UI element properties to the testing application at action 6.

Figure 2:
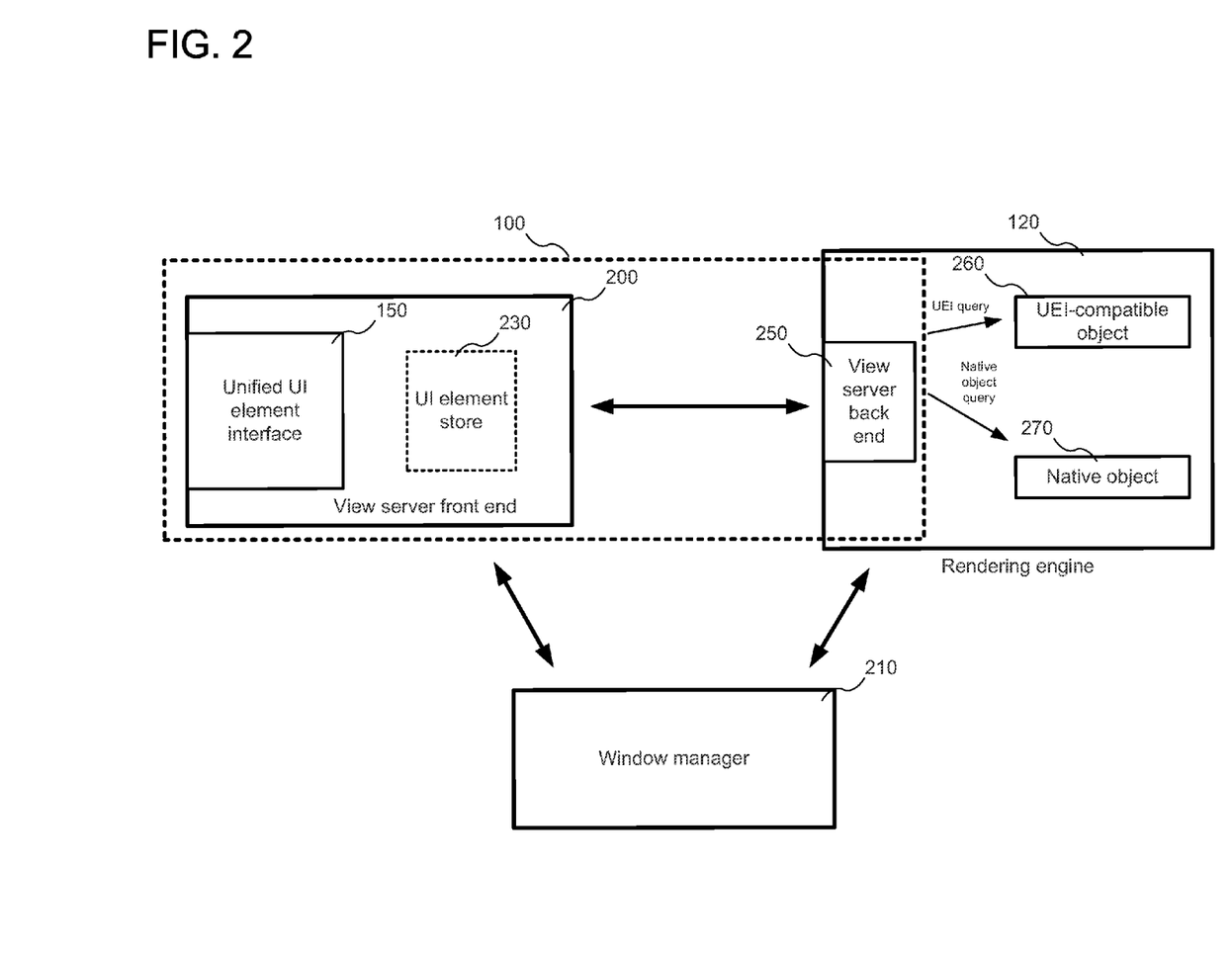
FIG. 2 is a block diagram illustrating logical components and interaction points of a view server implementing a unified UI element interface, in accordance with various embodiments.

FIG. 2 is a block diagram illustrating logical components and interaction points of the view server 100 implementing the UEI 150, in accordance with various embodiments. As discussed above, the view server 100 may, in some embodiments, include multiple components. Among these may be a view server front end 200 and one or more view server back ends 250. The view server back end 250 may be configured to operate in close association with a rendering engine, such as rendering engine 120, while the view server front end 200 may be configured to provide the application-facing (e.g. "front") UEI 150. Through the use of a divided front end/back end structure, the combined view server 100 may be configure to operate in a modular fashion, facilitating easier interactions with multiple rendering engines. For example, developers, when faced with a new rendering engine, or modifications to an existing rendering engine, may only have to develop or modify code for the view server back end 250 that is associated with that rendering engine, rather that modifying operation of the entire view server 100 entity.

Further, a particular view server back end 250 may be configured to operate with techniques that are particularized to the rendering engine with which it is associated. For example, in various embodiments, a rendering engine may render multiple objects using different internal structures; these structures may require different and particularized handling by the view server back end 250. In the example of the example rendering engine 120, which utilizes Java™ for rendering, UI elements may be implemented in a variety of ways. In various embodiments, the UEI may be configured to return UI element properties using a particularly-defined user interface property structure. Some UI elements may be represented in the rendering engine using objects that include methods that can be called to provide UI element properties in the UEI-defined user interface property structure. In such cases, these structures may be directly returned by the UEI 150 without requiring additional processing. These objects may be specifically implemented, such as by an application developer, to provide UI element properties in the user interface property structure that is defined to be returned by the UEI, and thus may facilitate consistent output from the UEI. These objects may be referred to herein as "UEI compatible" objects 260. When obtaining UI element properties for such elements rendered by such objects, the view server back end 250 may simply query the UEI compatible method, receive a UI element property structure to return to the view server front end 200, and return the structure from the view server front end 200 to the requesting application.

By contrast, in some embodiments, a UI element may be represented in the rendering engine 120 using a native object 270 that is not UEI compatible, but which nonetheless allows for native object querying. An example of such an object might be a Java™ Button object, which has a series of associated properties that can be queried programmatically. In another example, if the rendering engine utilizes JavaScript, a document object model may be consulted to query UI element properties. In such a scenario, the view server back end 250 may be configured to query the native object 270 to obtain UI element properties, assemble the UI element properties to generate a UI element structure compatible with the UEI 150, and return the generated structure to the view server front end 200 for response to the requesting application. In some embodiments, the native object 270 may not provide detailed UI element properties, such as for, example, if the native object 270 is a simple image. In such scenarios, the view server back end may perform only simple object queries to identify a default level of properties (e.g., location, size, alt text) that may then be packaged for returning to the view server front end 200 and then the requesting application.

The view server front end may communicate with a window manager 210 to facilitate communication with the view server back end 250. The window manager 210 may be configured to operate separately from the one or more rendering engines 120 to maintain and provide information about windows being rendered. For example, the window manager 210 may be configured to respond to queries for information about windows that are being rendered. For example, window manager may be configured to respond to queries for rendered windows from the testing application 105. The window manager 210 may reply to such a query with a list of windows. The list of windows provided by the window manager 210 may include one or more window names (or other unique identifiers) that may later be used as input to the UEI 150 to request UI element information. The window manager 210 may also be configured to respond to queries from the view server front end 200 for one or more rendering engines 120 that are rendering UI elements in a window. The window manager 210 may reply to such queries by identifying rendering engines 120 rendering UI elements. This information can then be used by the view server front end 200 to communicate with the relevant view server back end 250 to implement the UEI.

The view server front end 200 and one or more view server back ends 250 may be configured to communicate using a message exchange data exchange protocol or other type of communication protocol that does not require particularized knowledge of the view server back ends 250 and/or rendering engines 120 by the view server front end 200. By allowing the view server front end 200 to communicate with multiple view server back ends 250 using a standardized message protocol, the view server front end 200 may be aided in communicating with varied rendering engines 120. In some embodiments, JavaScript Object Notation ("JSON") or another communication protocol may be utilized for such communication.

As illustrated in FIG. 2, the view server front end 200 may also include structures to facilitate implementation of the UEI 150. For example, the view server front end 200 may optionally include a UI element store 230, which may include indications of UI elements for particular windows, in order to facilitate later EP requests.

Figure 3:
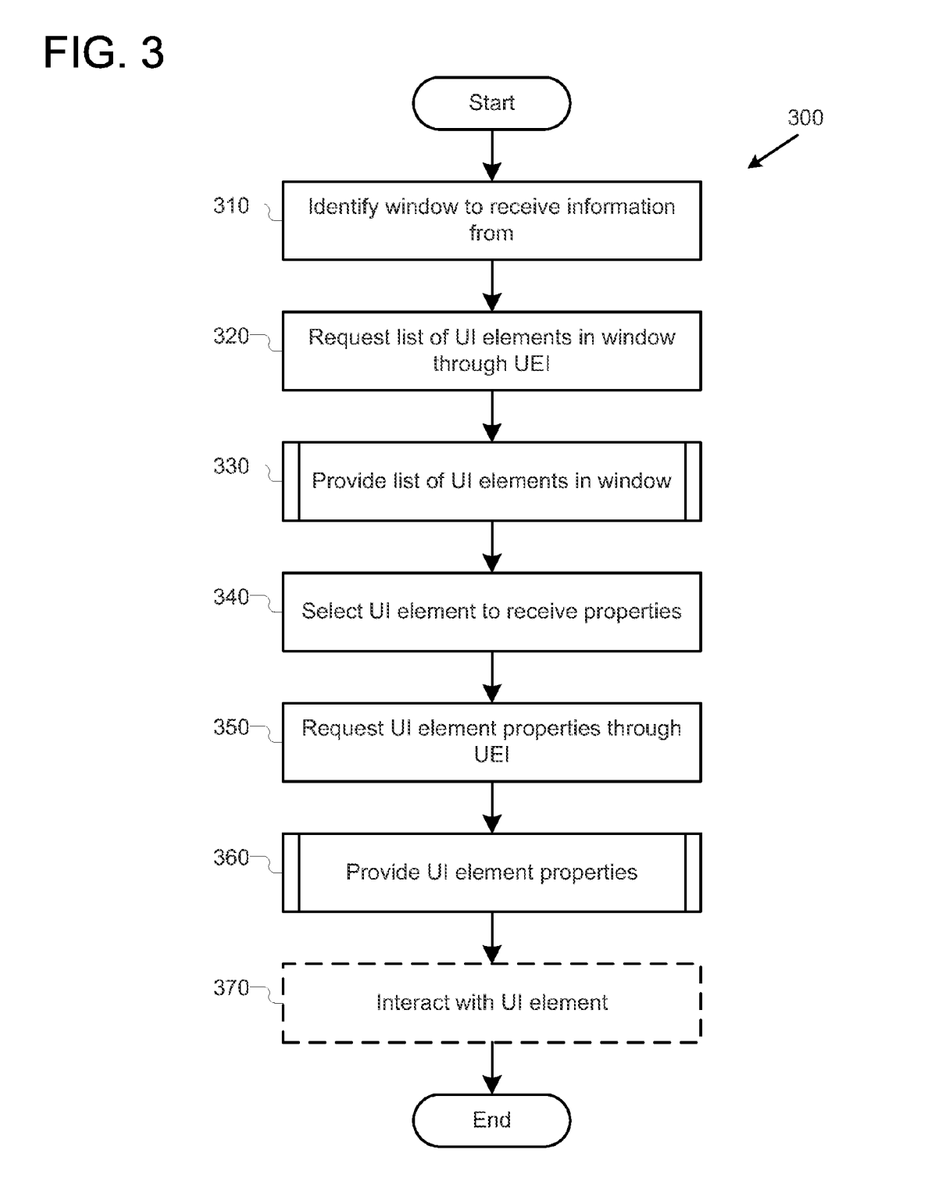
FIG. 3 illustrates an example process for obtaining UI element information using a unified UI element interface, in accordance with various embodiments.

FIG. 3 illustrates an example process 300 for obtaining UI element information using a unified UI element interface, in accordance with various embodiments. The process may begin at 310, where an application, such as testing application 105, may identify a window from which it intends to receive information from. In some embodiments, the testing application 105 may identify the window based on a query to the window manager 210 for a list of windows being rendered. This list may include window names or other unique identifiers of windows being rendered. Next, at 320, the application may request and a list of UI elements from the identified window. At 330, the view server 100 may provide the list of UI elements in a response through the UEI 150. Particular examples of this provisioning are described in greater detail below with reference to process 400 of FIG. 4.

Next, at 340, the application may select a UI element, such as from the received list, from which it wishes to receive properties. Then, at 350, the application may request UI element properties for the selected UI element. At 360, the view server 100 may provide the UI element properties in a response through the UEI 150. Particular examples of this provisioning are described in greater detail below with reference to process 500 of FIG. 5. Then, at 370, the application may interact with the UI element based on the received UI element properties. In some embodiments, the interaction may be optional; instead, the application may simply use the received properties to very UI element information, or may use the received UI element properties in a different manner.

Figure 4:
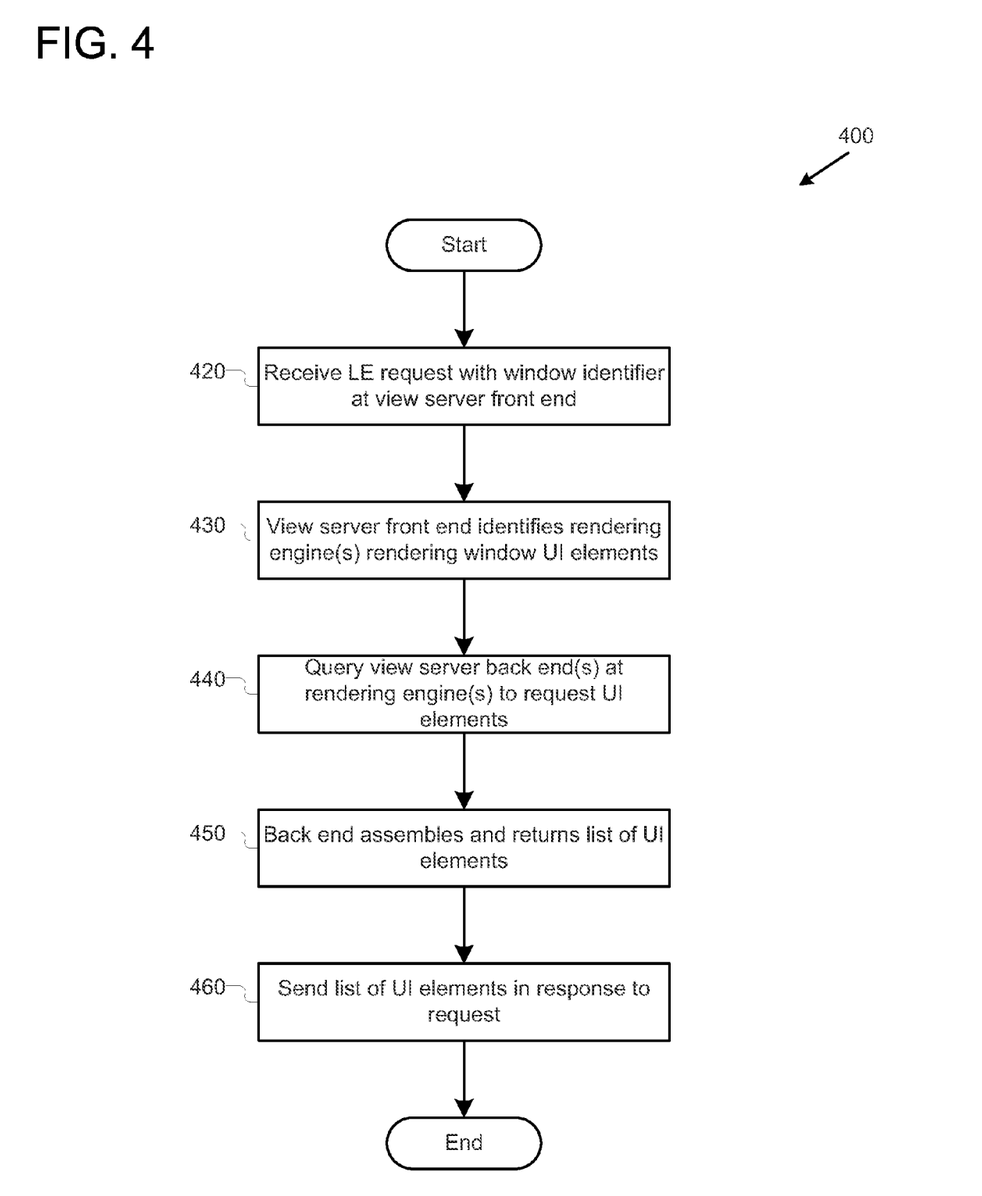
FIG. 4 illustrates an example process for provisioning a list of UI elements, in accordance with various embodiments.

FIG. 4 illustrates an example process 400 for provisioning a list of UI elements, in accordance with various embodiments. Process 400 may describe examples of implementations of 330 of process 300 of FIG. 3. The process may begin at 420, where the view server front end 200 may receive an LE request from the requesting application. The LE request may include an identifier of the window for which the application wishes to obtain UI element information. In various embodiments, the identifier may include a window name or other unique identifier, which may have been previously obtained from the window manager 210.

Next, at 430, the view server front end may identify rendering engines that render UI elements for the identified window. This identification may be made by querying the window manager 210 to obtain information identifying one or more rendering engines 120 that are rendering UI elements in the identified window. In some embodiments, if only one rendering engine is configured to render UI elements for the window, then only one rendering engine may be identified at 430. If multiple rendering engines are rendering UI elements in the identified window, however, multiple rendering engines may be identified. Next, at 440, the view server front end 200 may query the one or more view server back ends 250 to request lists of UI elements rendered in the identified window by the respective rendering engines. At 450, the view server back ends 250 may assemble and return a list of UI elements that are rendered in the identified window by their respective rendering engines. In some embodiments, these UI elements may be stored in the UI element store 230, such as to facilitate later identification of rendering engines for responses to EP requests. Then, at 460, the view server front end 200 may send the list of UI elements to the requesting application in response to the request. The process may then end.

Figure 5:
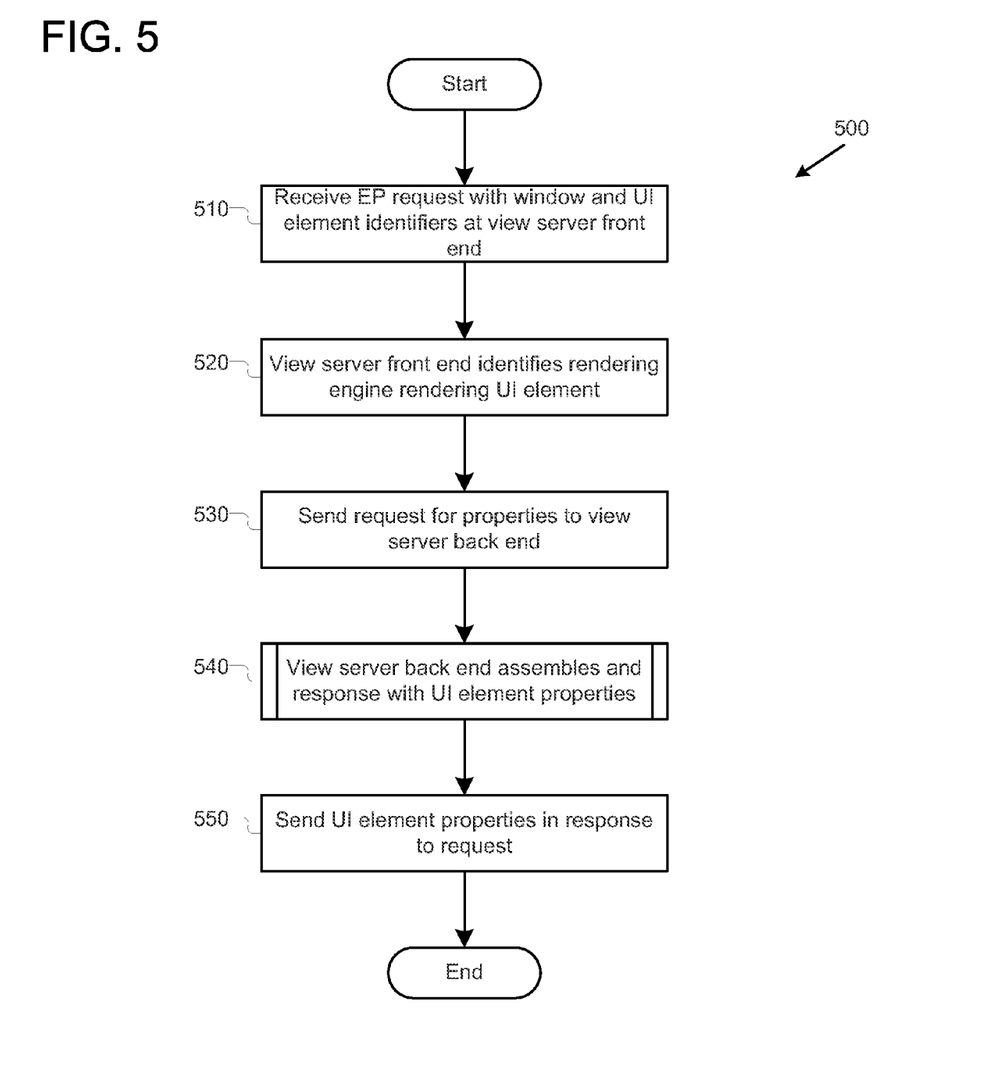
FIG. 5 illustrates an example process for receiving UI element properties, in accordance with various embodiments.

FIG. 5 illustrates an example process 500 for receiving UI element properties, in accordance with various embodiments. Process 500 may describe examples of implementations of 360 of process 300 of FIG. 3. The process may begin at 510, where the view server front end 200 may receive an EP request for UI element properties of a particular UI element. The EP request may include an identifier of a window as well as an identifier of the particular UI element for which information is desired. Next, at 520, the view server front end 200 may identify which rendering engine is rendering the identified UI element. In some embodiments, if each window is rendered by only one rendering engine, then at 520, the view server front end 200 may simply query the window manager 210 to obtain information identifying the rendering engines 120 that is rendering UI elements in the identified window. However, if multiple rendering engines are rendering UI elements in a window, then the view server front end 200 may refer to UI element information stored in the UI element store 230.

Next, at 530, the view server front end may send a request for UI element properties to the view server back end 250 associated with the previously-identified rendering engine. In response, at 540, the view server back end 250 may assemble and respond with UI element properties. Particular examples of this provisioning are described in greater detail below with reference to process 600 of FIG. 6. Next, at 550, the view server front end 200 may respond to the requesting application with the received UI element properties. The process may then end.

Figure 6:
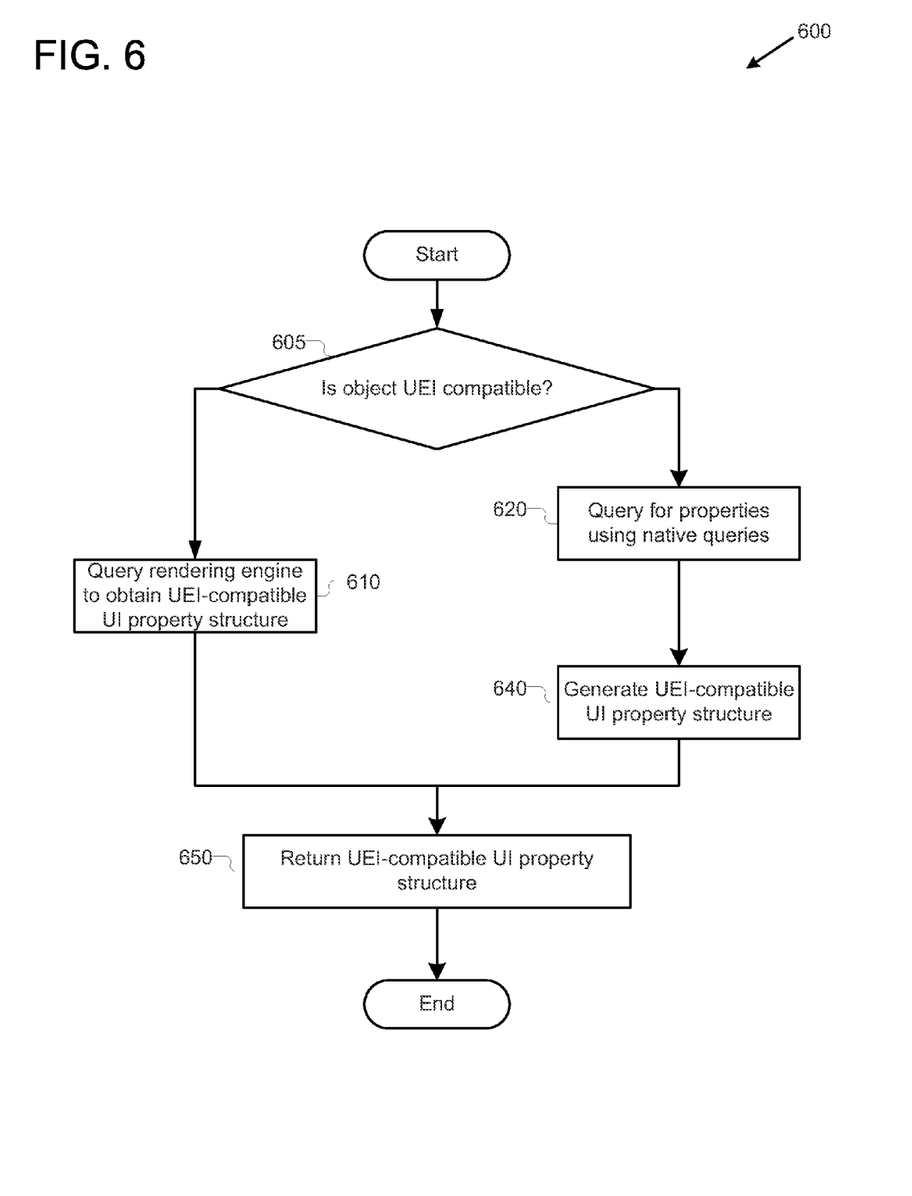
FIG. 6 illustrates an example process for a view server back end to assemble UI element properties, in accordance with various embodiments.

FIG. 6 illustrates an example process 600 for a view server back end 250 to assemble UI element properties, in accordance with various embodiments. The process may begin at 605, where the view server back end may determine, for an identified UI element, whether the identified UI element is represented by a UEI compatible object? If so, then at 610, the view server back end 250 may query the rendering engine to obtain a UEI-compatible UI element property structure.

If, however, the identified UI element is not represented by a UEI compatible object, then at 620, the view server back end 250 may query the rendering object for UI element properties using the native queries. In some scenarios, the view server back end 250 may obtain default properties for the represented UI element as part of 620. In either event, at 640 the view server back end 250 may then generate a UEI-compatible property structure. Then, at 650, regardless of whether the UEI-compatible property structure was obtained from the rendering engine or was generated, the UEI-compatible property structure may be returned by the view server back-end at 650. Such returning of the UEI-compatible UI property structure may include packaging of the structure in a JSON protocol (or other protocol used for communication between the view server front end 200 and view server back end 250). The process may then end.

Figure 7:
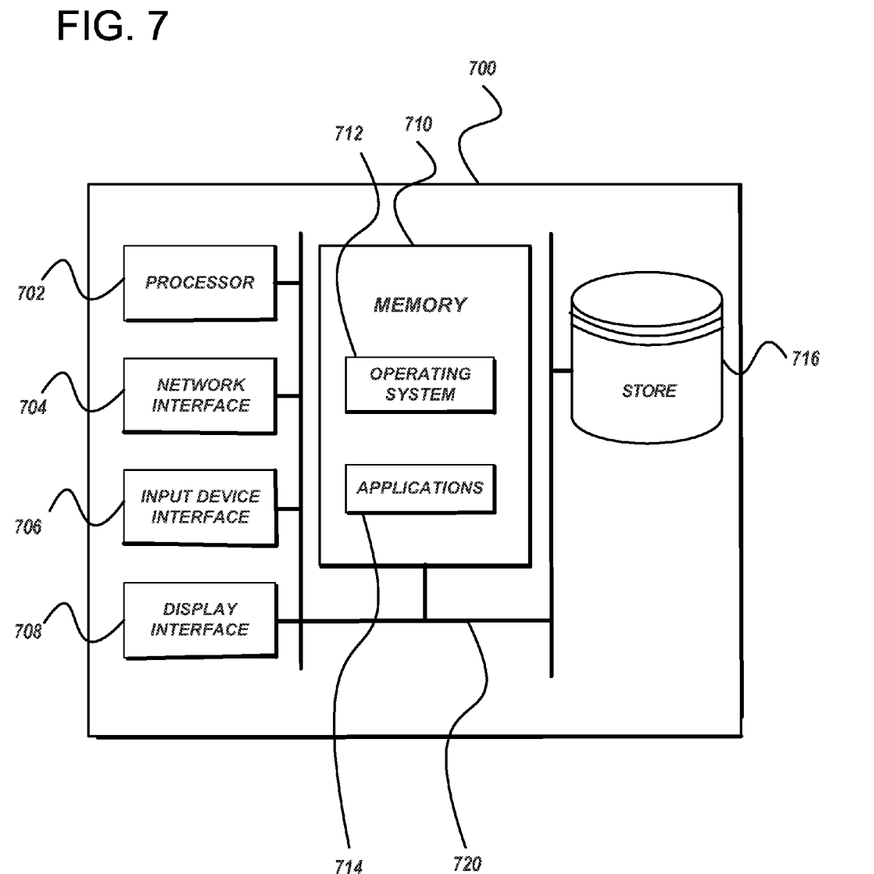
FIG. 7 illustrates an example computing environment in which embodiments described in the present disclosure may be implemented in accordance with various embodiments.

FIG. 7 illustrates an example environment (e.g., one or more computing devices) suitable for implementing embodiments of the arrangement described herein in accordance with various embodiments.

The computing devices may include, but are not limited to, laptop or tablet computers, personal computers, workstations, mini- and mainframe computers, and the like. The computing devices may also include specially configured computers for performing testing. The general architecture of a suitable computing device is described below in regard to FIG. 7. More particularly, FIG. 7 is a block diagram illustrating exemplary components of a computing device 700 suitable for testing applications. However, the following description of the exemplary components of a computing device 700 should be viewed as illustrative only and not construed as limiting in any manner.

With regard to FIG. 7, the exemplary computing device 700 includes a processor 702 in communication with a variety of other components over a system bus 720. These other components may include, by way of example, a network interface 704, an input device interface 706, a display interface 708 and a memory 710. As appreciated by those skilled in the art, the network interface 704 enables the computing device 700 to communicate data, control signals, data requests and other information with other resources including computers, data sources, storage devices and the like, on a computer network such as the Internet (not shown). The network interface 704 may be configured to communicate via wired or wireless connections. As one skilled in the art will appreciate, the computing device 700 may store information from another computer or a storage device, such as in the store 716.

The input device interface 706, sometimes also embodied as an input/output interface, enables the computing device 700 to obtain data input from a variety of devices including, but not limited to, a digital pen, a touch screen, a keyboard, a mouse, a scanner and the like. In addition to the exemplary components described above, a display interface 708 is used for outputting display information to a computer user. Typically, the display information is output by the display interface 708 via a display device (e.g., a CRT monitor, an LCD screen, an e-ink screen, a television, an integrated screen or sets of screens, etc.). Of course, while not shown, one skilled in the art will appreciate that a display device may be incorporated as an integral element within a computing device 700.

The processor 702 is configured to operate in accordance with programming instructions stored in a memory 710. The memory 710 generally comprises RAM, ROM and/or other permanent memory. Thus, in addition to storage in read/write memory (RAM), programming instructions may also be embodied in read-only format, such as those found in ROM or other permanent memory. The memory 710 typically stores an operating system 712 for controlling the general operation of the computing device 700. The operating system may be a general purpose operating system such as a Microsoft Windows®. operating system, a UNIX®. operating system, a Linux®. operating system, or an operating system specifically written for and tailored to the computing device 700. Similarly, the memory 710 also typically stores user-executable applications 714, or programs, for conducting various functions on the computing device 700.

Techniques described herein, including those of the view server 100, view server front end 200 and/or view server back end 250, may be implemented in a single application or module (e.g., application 714) implemented on a computing device 700, or in a plurality of cooperating applications/modules (e.g., 710, 720, 730 and 740) on a single computing device, or in a plurality of cooperating applications and/or modules distributed in a computer network. However, irrespective of the actual implementation and/or topography of the learning path identification system, the techniques described herein may be identified with regard to various logical components.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A computer-implemented method for performing testing of user interface elements of an application, the method comprising:
   identifying, by a testing application of a computing device, a displayed window of the application for which testing is desired, the displayed window being rendered by a rendering engine operating on the computing device;
   requesting, by the testing application, through a programmatic unified user interface element query interface of a view server computing module operating on the computing device, the view server computing module being in communication with the rendering engine, a list of one or more user interface elements included in the displayed window, wherein the view server computing module implements the programmatic unified user interface element query interface to programmatically receive indications of currently rendered windows or user interface elements from the application for which testing is desired and, in response, to programmatically provide information about the currently rendered windows or user interface elements to the testing application;
   obtaining, by the view server computing module, the list of one or more user interface elements from the rendering engine;
   sending, by the view server computing module, the list of the one or more user interface elements to the testing application;
   selecting, by the testing application, from the list of one or more user interface elements, a user interface element for testing;
   requesting, by the testing application, from the view server computing module, through the programmatic unified user interface element query interface, user interface element properties of the selected user interface element;
   obtaining, by the view server computing module, one or more user interface element properties of the selected user interface elements from the rendering engine;
   sending, by the view server computing module, the one or more user interface element properties to the testing application; and
   performing, by the testing application, one or more testing interactions with the selected user interface element based on the one or more user interface properties to validate that the selected user interface element has been rendered properly.

2. The method of claim 1, wherein obtaining the list of one or more user interface elements from the rendering engine comprises querying the rendering engine through a view server back end associated with the rendering engine.

3. The method of claim 1, wherein obtaining the one or more user interface properties from the rendering engine comprises requesting the rendering engine to provide a user interface element property structure that is configured to be directly returned by the programmatic unified user interface element query interface without requiring additional processing to be compatible with the programmatic unified user interface element query interface.

4. The method of claim 1, wherein obtaining the one or more user interface properties from the rendering engine comprises generating a user interface property structure by assembling user interface property information received from the rendering engine to form the user interface property structure.

5. A computer-implemented method for facilitating interaction with user interface elements of an application, the method comprising:
   providing, by a view server computing device, a programmatic unified user interface element query interface for receiving programmatic requests for user interface element information for user interface elements currently rendered by a plurality of rendering engines, wherein the view server computing device programmatically receives indications of currently rendered windows or user interface elements;

receiving, by the view server computing device, through the programmatic unified user interface element query interface, a programmatic request for information about a first set of user interface elements of a window rendered by a first rendering engine of the plurality of rendering engines, wherein receiving the programmatic request for information comprises receiving a request to identify user interface elements in the window;

obtaining, by the view server computing device, for each user interface element of the first set of user interface elements, user interface element information from the first rendering engine; and programmatically providing, by the view server computing device, the user interface element information for each user interface element of the first set of user interface elements, wherein programmatically providing the user interface element information comprises programmatically providing a list of identifiers for each user interface element in the first set of user interface elements in the window.

6. The method of claim 5, wherein receiving the programmatic request for information comprises receiving a request for user interface properties of a user interface element in the window.

7. The method of claim 6, wherein obtaining user interface element information comprises requesting the first rendering engine to provide the user interface properties in a user interface element property structure that is configured to be directly returned by the unified user interface element query interface without requiring additional processing to be compatible with the unified user interface element query interface.

8. The method of claim 6, wherein obtaining user interface element information comprises performing one or more native object queries of one or more native user interface element property interfaces implemented by the first rendering engine for information about the user interface element.

9. The method of claim 8, wherein:
the first rendering engine is implemented in JAVA®, and the one or more native user interface element property interfaces comprise native JAVA® object interfaces; or
the first rendering engine is implemented in JAVASCRIPT®, and the one or more native user interface element property interfaces comprise document object model interfaces.

10. The method of claim 6, wherein obtaining user interface element information comprises generating a user interface property structure by assembling user interface property information received from the first rendering engine to form the user interface property structure.

11. The method of claim 5, wherein:
receiving the request for user interface element information comprises receiving the request at a view server front end that is not associated with the first rendering engine; and
obtaining the user interface element information comprises obtaining the user interface element information from a view server back end that is associated with the first rendering engine.

12. The method of claim 5, wherein information about the first set of user interface elements comprises a list of rendered user interface elements.

13. The method of claim 5, wherein information about the first set of user interface elements comprises one or more of: location, size, shape, title, text, activity, activation information, focus, or visibility.

14. The method of claim 5, wherein receiving a programmatic request comprises receiving the programmatic request from an application external to the programmatic unified user interface element query interface.

15. A computing system for facilitating interaction with user interface elements of an application executing on the computing system, comprising:
one or more computing processors;
one or more non-transitory computer readable media including instructions written thereon that, when executed by the computing processors cause the computing processors to:
provide a programmatic unified user interface element query interface for receiving programmatic requests for user interface element information for user interface elements currently rendered by a plurality of rendering engines, wherein the programmatic unified user interface element query interface programmatically receives indications of currently rendered user interface elements;
receive a programmatic request through the programmatic unified user interface element query interface for information about a first set of user interface elements of a window rendered by a first rendering engine of the plurality of rendering engines, wherein receive the programmatic request for information comprises receive a programmatic request for user interface properties of a user interface element in the window;
obtain, for each user interface element of the first set of user interface elements, user interface element information from the first rendering engine, wherein obtain user interface element information comprises request the first rendering engine to provide user interface properties in a user interface element property structure that is configured to be directly returned by the unified user interface element query interface without requiring additional processing to be compatible with the unified user interface element query interface; and
programmatically provide the request with user interface element information for teach user interface element of the first set of user interface elements.

16. The computing system of claim 15, wherein receive the programmatic request for information comprises receive a request to identify user interface elements in the window.

17. The computing system of claim 16, wherein programmatically provide the user interface element information comprises provide a list of identifiers for each user interface element in the first set of user interface elements in the window.

18. The computing system of claim 15, wherein obtain user interface element information comprises perform one or more native object queries implemented by the first rendering engine for information about the user interface element.

19. The computing system of claim 15, wherein obtain user interface element information comprises generate a user interface property structure through assembly of user interface property information received from the first rendering engine to form the user interface property structure.

20. The computing system of claim 15, wherein:
receive the programmatic request for user interface element information comprises receive the programmatic request at a view server front end that is not associated with the first rendering engine; and obtain the user interface element information comprises obtain the user interface element information from a view server back end that is associated with the first rendering engine.

21. The computing system of claim 15, wherein information about the first set of user interface elements comprises a list of rendered user interface elements.

22. The computing system of claim 15, wherein information about the first set of user interface elements comprises one or more of: location, size, shape, title, text, activity, activation information, focus, or visibility.

23. The computing system of claim 15, wherein receive a programmatic request comprises receive the programmatic request from an application external to the programmatic unified user interface element query interface.

* * * * *